United States Patent
Park et al.

(10) Patent No.: US 9,609,664 B2
(45) Date of Patent: Mar. 28, 2017

(54) LAYERED CHANNEL ACCESS METHOD AND APPARATUS IN WIRELESS LOCAL AREA NETWORK SYSTEM

(75) Inventors: Jong Hyun Park, Anyang-si (KR); Yong Ho Seok, Anyang-si (KR); Ill Soo Sohn, Anyang-si (KR); Eun Sun Kim, Anyang-si (KR); Suh Wook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 14/114,487

(22) PCT Filed: Nov. 29, 2011

(86) PCT No.: PCT/KR2011/009176
§ 371 (c)(1),
(2), (4) Date: Nov. 20, 2013

(87) PCT Pub. No.: WO2012/148061
PCT Pub. Date: Nov. 1, 2012

(65) Prior Publication Data
US 2014/0064231 A1    Mar. 6, 2014

Related U.S. Application Data

(60) Provisional application No. 61/480,380, filed on Apr. 29, 2011, provisional application No. 61/508,041, filed on Jul. 14, 2011.

(51) Int. Cl.
*H04W 74/00* (2009.01)
*H04W 12/06* (2009.01)
(Continued)

(52) U.S. Cl.
CPC ........ *H04W 74/002* (2013.01); *H04W 12/06* (2013.01); *H04W 52/367* (2013.01);
(Continued)

(58) Field of Classification Search
None
See application file for complete search history.

(56) References Cited

U.S. PATENT DOCUMENTS

2009/0279526 A1*  11/2009  Ichikawa ............ H04W 76/02
                                            370/338
2011/0064040 A1*   3/2011  Kim .................... H04L 1/0631
                                            370/329
(Continued)

FOREIGN PATENT DOCUMENTS

JP    2009509469 A    3/2009
JP    2009539301 A    11/2009
(Continued)

*Primary Examiner* — Charles C Jiang
*Assistant Examiner* — George Atkins, Jr.
(74) *Attorney, Agent, or Firm* — Dentons US LLP

(57) ABSTRACT

A layered channel access method of a Group Representative-station (GR-STA) in a Wireless Local Area Network (WLAN) system is provided. The method includes receiving a management, including setting information indicative of a first phase and a second phase frame, from an Access Point (AP), receiving a first radio frame from the AP or accessing a channel and sending a second radio frame to the AP during the first phase indicated by the setting information, and receiving a third radio frame from an affiliated STA of a group to which the GR-STA belongs or accessing a channel and sending a fourth radio frame to at least one STA of the group to which the GR-STA belongs during the second phase indicated by the setting information.

6 Claims, 13 Drawing Sheets

(51) Int. Cl.
*H04W 52/36* (2009.01)
*H04W 72/12* (2009.01)
*H04W 74/08* (2009.01)
*H04W 84/12* (2009.01)

(52) U.S. Cl.
CPC ....... *H04W 72/121* (2013.01); *H04W 74/006* (2013.01); *H04W 74/08* (2013.01); *H04W 84/12* (2013.01)

(56) References Cited

U.S. PATENT DOCUMENTS

2011/0128900 A1* 6/2011 Seok ................ H04W 74/04
370/311
2012/0163349 A1* 6/2012 Fontaine ........... H04W 72/1263
370/336

FOREIGN PATENT DOCUMENTS

| JP | 2010519875 A | 6/2010 | |
|----|---|---|---|
| WO | 2008/069406 A2 | 6/2008 | |
| WO | WO 2008/104095 A1 * | 9/2008 | |
| WO | WO-2008104095 A1 * | 9/2008 | ............. H04L 12/28 |
| WO | WO-2010013897 A1 * | 2/2010 | ............... H04B 7/26 |
| WO | 2011-021365 A1 | 2/2011 | |

* cited by examiner

FIG. 5

| Element ID | Length | Group Index | GR-STA MAC address |
|---|---|---|---|
| 1 | 1 | 1 | 6 |

Octets:

FIG. 6

| Category | Action | Length | Group Index | GR-STA MAC address |
|---|---|---|---|---|
| 1 | 1 | 1 | 1 | 6 |

Octets:

FIG. 7

| Element ID | Length | Local Communication Offset | Local Communication Duration | Local Communication Max Transmit Power | GR Communication Offset | GR Communication Duration | GR Communication Max Transmit Power |
|---|---|---|---|---|---|---|---|
| 1 | 1 | 2 | 2 | 1 | 2 | 2 | 1 |

Octets:

LAYERED CHANNEL ACCESS METHOD AND APPARATUS IN WIRELESS LOCAL AREA NETWORK SYSTEM

This application is a 35 USC §371 National Stage entry of International Application No. PCT/KR2011/009176 filed on Nov. 29, 2011, and claims priority to U.S. Provisional Application Nos. 61/480,380 filed on Apr. 29, 2011 and 61/508,041 filed on Jul. 14, 2011, each of which is hereby incorporated by reference in its entirety.

BACKGROUND OF THE INVENTION

Field of the invention

The present invention relates to wireless communication and, more particularly, to a layered channel access method and apparatus in a Wireless Local Area Network (WLAN) system.

Related Art

With the recent development of information communication technology, a variety of wireless communication techniques are being developed. From among the techniques, a WLAN is technology for wirelessly accessing the Internet at homes or companies or in specific service providing areas using mobile terminals, such as a Personal Digital Assistant (PDA), a laptop computer, and a Portable Multimedia Player (PMP), based on radio frequency technology.

Lots of standardization tasks are being carried out since Institute of Electrical and Electronics Engineers (IEEE) 802 (i.e., a standard organization for WLAN technology) was set up on February, 1980.

The basic access mechanism of IEEE 802.11 Medium Access Control (MAC) is a Carrier Sense Multiple Access with Collision Avoidance (CSMA/CA) mechanism associated with binary exponential back-off. The CSMA/CA mechanism is also called a Distributed Coordination Function (DCF) of IEEE 802.11 MAC, and it basically adopts a "listen before talk" access mechanism. In this type of an access mechanism, a Station (STA) listens to a wireless channel or medium prior to transmission. If, as a result of the listening, the medium is detected not to be used, the listening STA starts its own transmission. If, as a result of the listening, the medium is detected to be used, however, the listening STA does not start its own transmission and enters a delay period which is determined by a binary exponential back-off algorithm.

The CSMA/CA mechanism also includes virtual carrier sensing in addition to physical carrier sensing where an STA directly listens to a medium. The virtual carrier sensing is for supplementing a limit of physical carrier sensing, such as a hidden node problem. For virtual carrier sensing, IEEE 802.11 MAC uses a Network Allocation Vector (NVA). The NVA is a value that an STA, now using a medium or having a right to use the medium, indicates to another STA the time remaining until the medium is available. Accordingly, the value of the NVA is related to a period where the use of a medium is reserved by an STA that transmits a relevant frame.

One of procedures of setting the NVA is a procedure of exchanging a Request To Send (RTS) frame and a Clear To Send (CTS) frame. The RTS frame and the CTS frame include information that may delay the transmission of frames by reception STAs by informing the reception STAs of upcoming frame transmission. The information may be included in, for example, the duration fields of the RTS frame and the CTS frame. After the RTS frame and the CTS frame are exchanged, a source STA transmits an actual frame to a destination STA.

The CSMA/CA-based channel access method, however, has a problem in that efficiency is not high. For example, if a PHY Service Access Point (SAP) provides a throughput of 1 Gbps, a MAC SAP may provide only about 50 to 60% of the throughput of 1 Gbps that is provided by the PHY SAP. Furthermore, if a plurality of STAs is associated with one Access Point (AP), the entire efficiency of a WLAN system may be deteriorated. An individual STA must access a channel through a contention and may find it further difficult to obtain an opportunity to send a radio frame using a Wireless Medium (WM).

SUMMARY OF THE INVENTION

It is an object of the present invention to provide a layered channel access method and apparatus in a WLAN system.

In an aspect of the present invention, a layered channel access method of a Group Representative-station (GR-STA) in a Wireless Local Area Network (WLAN) system includes receiving a management, including setting information indicative of a first phase and a second phase frame, from an Access Point (AP), receiving a first radio frame from the AP or accessing a channel and transmitting a second radio frame to the AP during the first phase indicated by the setting information, and receiving a third radio frame from an affiliated STA of a group to which the GR-STA belongs or accessing a channel and transmitting a fourth radio frame to at least one STA of the group to which the GR-STA belongs during the second phase indicated by the setting information.

The setting information may include a start time and duration of the first phase and a start time and duration of the second phase.

The setting information may further include first maximum transmit power information allowed to STAs sending radio frames in the first phase and second maximum transmit power information allowed to STAs sending radio frames in the second phase.

The management frame may be a beacon frame periodically broadcasted by the AP.

The first radio frame may include a Media Access Control (MAC) protocol data unit(MPDU) where the affiliated STA is a destination address.

The second radio frame may include a Media Access Control(MAC) protocol data unit(MPDU) where the AP receiving the second radio frame from the affiliated STA is a destination address.

The affiliated STA may set a Network Allocation Vector (NAV) and defer channel access during the first phase.

The third radio frame may be transmitted by the affiliated STA after the affiliated STA accesses a channel in the second phase.

In another aspect of the present invention, a channel access method of a Group Representative-station (GR-STA) in a Wireless Local Area Network (WLAN) system includes receiving a management, including setting information indicative of a first phase and a second phase frame, from an Access Point (AP), receiving a first radio frame from the AP or accessing a channel and transmitting a second radio frame to the AP during the first phase indicated by the setting information, performing an association procedure with an affiliated STA of a group to which the GR-STA belongs during the second phase indicated by the setting information, and receiving a third radio frame from the affiliated STA or accessing a channel and transmitting a fourth radio frame to at least one STA of the group to which the GR-STA belongs.

In still another aspect of the present invention, a station for supporting a layered channel access method in a Wireless Local Area Network (WLAN) system, includes a processor configured to receive a management frame, comprising setting information indicative of a first phase and a second phase, from an Access Point (AP), receive a first radio frame from the AP or access a channel and send a second radio frame to the AP during the first phase indicated by the setting information and receive a third radio frame from an affiliated station of a group to which a Group Representative-station (GR-STA) belongs or access a channel and send a fourth radio frame to at least one station of the group to which the GR-STA belongs during the second phase indicated by the setting information.

The management frame may be a beacon frame periodically broadcasted by the AP.

During the first phase, the affiliated station may set a Network Allocation Vector (NVA) and defers channel access.

The present invention provides a layered channel access method in a WLAN system. Accordingly, a limited WM may be efficiently used in an environment in which a plurality of STAs is associated with one Access Point (AP).

A network may be effectively managed for every STA group in an environment where a large number of STAs are associated with one AP.

According to the layered channel access method proposed by the present invention, network throughput due to spatial reuse may be improved, and a collision may be effectively handled in a special situation where a large number of STAs attempt a contention at the same time.

In the data frame relay process of a GR-STA, various forms of group-based communication schemes, such as a scheme for transmitting data by compressing the data according to a predefined application scheme or reducing the number of times of transmission, the amount of transmission, etc., can be used.

BRIEF DESCRIPTION OF THE DRAWINGS

FIG. 5 is a block diagram showing an example of a Group Indication Information Element (IE) format that may be included in the association response frame and transmitted;

FIG. 6 shows an example of a format of the management frame for informing an STA of a group and GR-STA information about the group;

FIG. 7 is a block diagram showing an example of a format of a Layered Channel Access IE (LCA IE);

DESCRIPTION OF EXEMPLARY EMBODIMENTS

A layered channel access method and apparatus are described in detail below with reference to the accompanying drawings.

Figure 1:
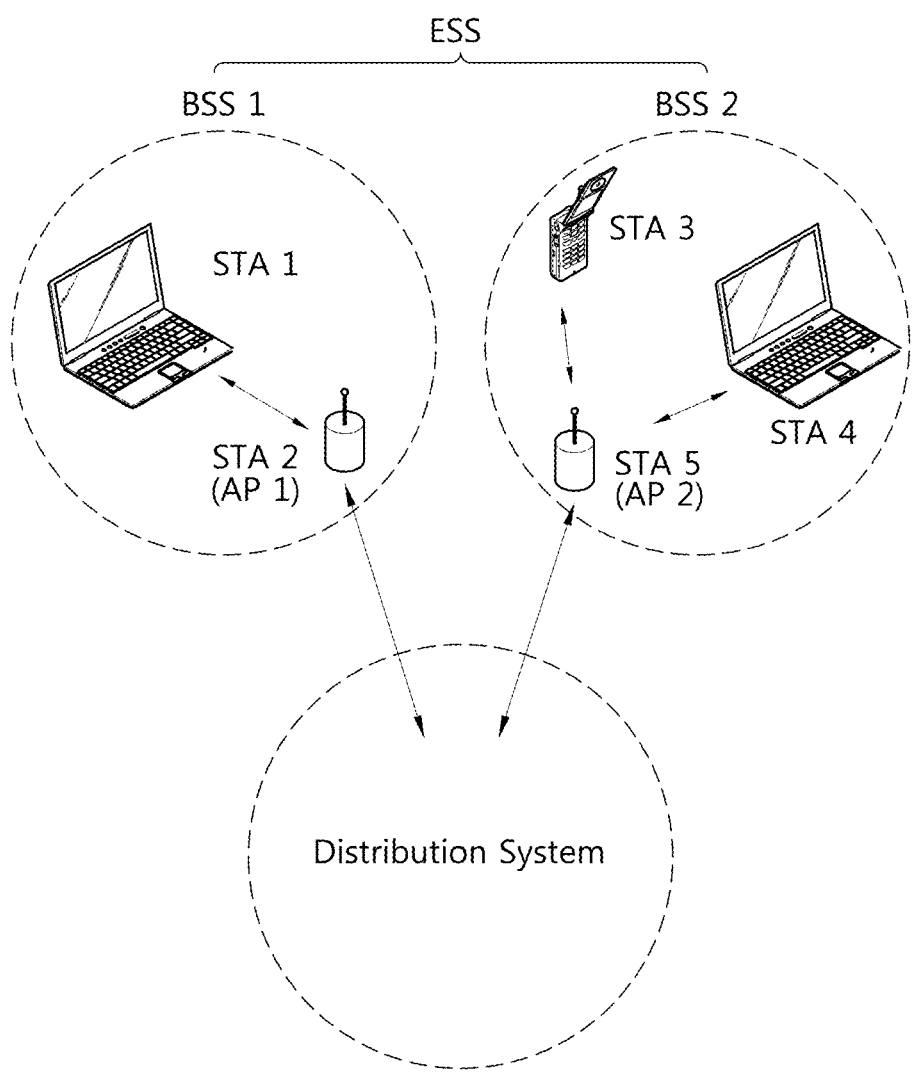
FIGS. 1 and 2 are simplified diagrams showing exemplary configurations of a WLAN system to which an embodiment of the present invention may be applied.
Figure 2:
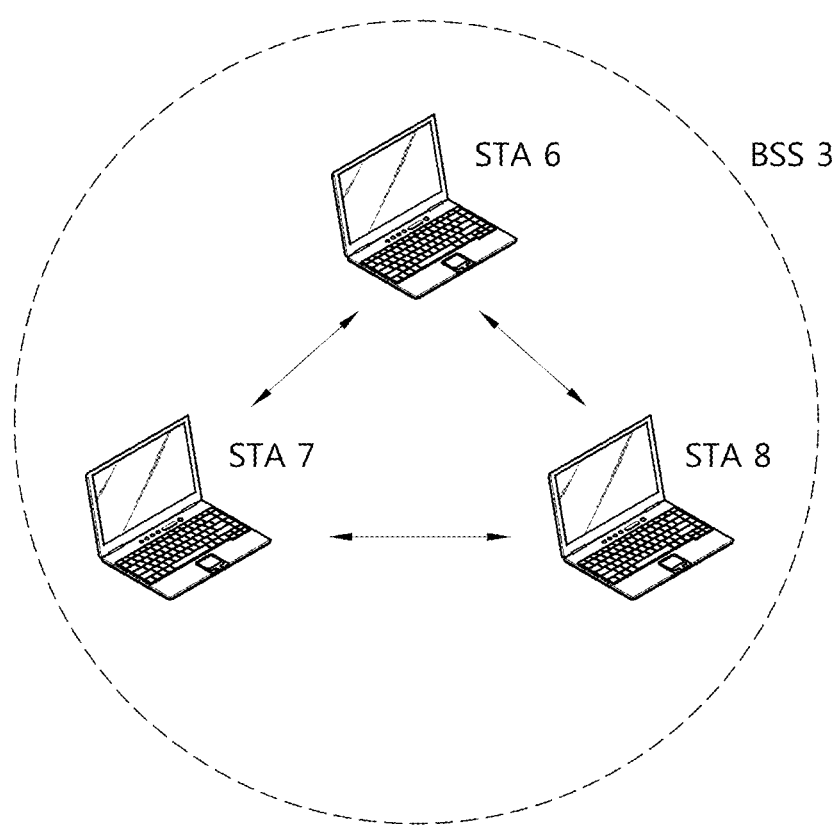

FIGS. 1 and 2 are simplified diagrams showing exemplary configurations of a WLAN system to which an embodiment of the present invention may be applied.

Referring to FIGS. 1 and 2, the WLAN system includes one or more Basic Service Sets (BSSs). The BSS is a set of STAs which are successfully synchronized with each other for communication, but is not a concept indicating a specific area. The BSS may be divided into an infrastructure BSS and an independent BSS (IBSS). The infrastructure BSS is shown in FIG. 1, and the IBSS is shown in FIG. 2. The infrastructure BSSs BSS1 and BSS2 include one or more STAs STA1, STA3, and STA4, an Access Point (AP) (i.e., an STA providing distribution service), and a Distribution System (DS) coupling a plurality of APs AP1 and AP2. Meanwhile, in the IBSS, all STAs include mobile STAs STA6, STA7, and STA8 because an AP is not included in the IBSS. Furthermore, the IBSS forms a self-contained network because access to a DS is not permitted.

An STA is a specific function entity, including MAC according to the IEEE 802.11 standard and a physical layer interface for a WM. In a broad sense, the STA includes both an AP and a non-AP STA. An STA for wireless communication includes a processor and a transceiver and may further include a user interface, display means, etc. The processor is a functional unit configured to generate frames to be transmitted over a wireless network or to process frames received over a wireless network. The processor performs several functions for controlling the STA. Furthermore, the transceiver is a unit functionally coupled to the processor and configured to transmit and receive frames over a wireless network for the STA.

A mobile terminal manipulated by a user, from among STAs, includes a non-AP STA (e.g., STA1, STA3, STA4, STA6, STA7, and STA8). When the mobile terminal is simply an STA, it is also called a non-AP STA. A non-AP STA may also be called another terminology, such as a Wireless Transmit/Receive Unit (WTRU), User Equipment (UE), a Mobile Station (MS), a Mobile Terminal (MT), or a Mobile Subscriber Unit.

Furthermore, the AP AP1 or AP2 is a functional entity for providing access to the DS via a wireless medium for STAs associated therewith. In an infrastructure BSS including an AP, communication between non-AP STAs is basically performed via the AP. If a direct link is set up, however, the non-AP STAs may directly communicate with each other.

An AP may also be called another terminology, such as a centralized controller, a Base Station (BS), a node-B, a Base Transceiver System (BTS), or a site controller.

A plurality of infrastructure BSSs may be interconnected through a Distribution System (DS). A plurality of BSSs coupled through the DS is called an Extended Service Set (ESS). STAs included in the ESS may communicate with each other. A non-AP STA may move from one BSS to the other BSS while performing seamless communication within the same ESS.

A Distribution System (DS) is a mechanism for enabling one AP to communicate with the other AP. According to this mechanism, if an AP transmits a frame for STAs associated with a BSS managed by the AP or one STA moves to another BSS, the AP may transfer the frame or may transfer the frame over an external network, such as a wired network. The DS may not be necessarily a network and is not limited to any form if the DS can provide specific distribution service defined in IEEE 802.11. For example, the DS may be a wireless network, such as a mesh network, or may be a physical structure for connecting APs together.

Figure 3:
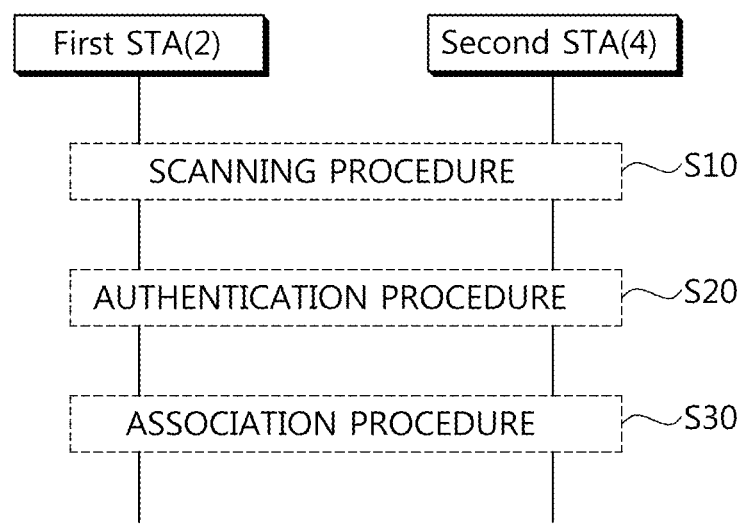
FIG. 3 is an operational procedure for illustrating authentication and association-related procedures of an STA in a WLAN system, such as that shown in FIG. 1 or 2, or a wireless communication system including the WLAN system.

FIG. 3 is an operational procedure for illustrating authentication and association-related procedures of an STA in a WLAN system, such as that shown in FIG. 1 or 2, or a wireless communication system including the WLAN system.

Referring to FIG. 3, a layered channel access procedure in a WLAN system according to an embodiment of the present invention may further include preliminary processes, such as a scanning procedure S10, an authentication procedure S20 and/or an association procedure S30. At least some of the preliminary processes may not be indispensable procedures, but may be arbitrary procedures.

Referring to FIG. 3, the scanning procedure S10 is first performed between a first STA(2) and a second STA(4). In the scanning procedure S10, the first STA(2) searches for a candidate STA to be associated therewith in the association procedure S30. For example, the scanning procedure S10 may be a process of a non-AP STA searching for an AP in an infrastructure BSS. In a broader sense, the scanning procedure S10 may also be considered to include a process of a non-AP STA searching for a neighboring non-AP STA in an IBSS or a process of a non-AP STA searching for a neighboring MP in a mesh network.

The scanning procedure includes two types. The first type is a passive scan method of using a beacon frame transmitted by the second STA(4). According to the passive scan method, the first STA(2) trying to access a WLAN may search for an accessible BSS (or IBSS) by receiving a beacon frame periodically transmitted by the second STA(4) (i.e., an AP managing the relevant BSS. The passive scan method may be used when the second STA(4) is an AP that sends a beacon frame.

The second type is an active scan method. According to the active scan method, the first STA(2) trying to access a WLAN system first sends a probe request frame. The second STA(4) (e.g., an AP) that has received the probe request frame sends a probe response frame, information such as a Service Set ID (SSID) of a BSS managed by the second STA(4) and its desired capability, to the first STA(2). Accordingly, the first STA(2) may know the existence of a candidate AP and various pieces of information about the candidate AP based on the received probe response frame.

In the scanning process S10, the beacon frame or the probe response frame transmitted by the second STA(4) may include information about whether the second STA(4) supports a layered channel access method. The first STA(2) may select an AP to be associated therewith on the basis of whether the second STA(4) supports the layered channel access method.

Referring back to FIG. 3, the authentication procedure S20 is performed between the first STA(2) and the second STA(4). The authentication procedure S20 is a process of negotiating an authentication procedure, an encryption scheme, etc. between entities participating in wireless communication. For example, the first STA(2) may perform the authentication procedure S20 with the second STA(4) (e.g., an AP) to be associated therewith, from among one or more APs retrieved in the scanning procedure S10. If an open system authentication scheme is used, the second STA(4) performs the authentication process without any condition in response to an authentication request made by the first STA(2). More enhanced authentication schemes may include IEEE 802.1x-based Extensible Authentication Protocol-Transport Layer Security (EAP-TLS), Extensible Authentication Protocol-Tunneled Transport Layer Security (EAP-TTLS), Extensible Authentication Protocol-Flexible Authentication via Secure Tunneling (EAP-FAST), Protected Extensible Authentication Protocol (PEAP), and so on.

After authentication is successfully completed in the authentication procedure S20, the first STA(2) performs the association procedure S30. The association procedure may be a random procedure that is performed when the first STA(2) is a non-AP STA and the second STA(4) is an AP. The association procedure S30 means connection identifiable (i.e., setting up a radio link) between the first STA(2) and the second STA(4). For the association procedure S30, the first STA(2) first sends an association request frame to the second STA(4) that has successfully completed the authentication procedure S20. In response thereto, the second STA(4) sends an association response frame, having a status value 'successful', to the first STA(2). The association response frame may include an identifier (e.g., an Association ID (AID)) for identifying association with the first STA(2).

If a connection state between the first STA(2) and the second STA(4) (i.e., an AP) becomes poor owing to a variable channel condition even after the association procedure S30 is successfully completed, the first STA(2) may perform the association procedure with another accessible AP again. This process is called a reassociation procedure. The reassociation procedure is very similar to the association procedure S30. More particularly, in the reassociation procedure, the first STA(2) sends a reassociation request frame to a third AP (i.e., an AP that has successfully completed the authentication procedure S20, from among candidate APs retrieved in the scanning process S10) not to the AP now being associated therewith. The third AP sends a reassociation response frame to the first STA(2). In this case, the reassociation request frame further includes information about the AP previously associated with the first STA(2). The reassociated AP may transfer data, buffered in the second STA(4) (i.e., the existing AP), to the first STA(2) through the information.

According to an aspect of the present embodiment, the association response frame and the reassociation response frame in the association procedure S30 or the reassociation procedure may also include information informing whether a layered channel access method is supported.

After the authentication procedure and the association procedure are performed between the first STA(2) and the second STA(4) as shown in FIG. 3, radio frames may be transmitted and received between the first STA(2) and the second STA(4). If the second STA(4) is an AP, a third STA other than the first STA(2) may be associated with the second STA(4) through the same process as that of FIG. 3, although not shown in FIG. 3. If a plurality of STAs is associated with an AP, each of the STAs must obtain a transmission opportunity. A method of the STA obtaining the transmission opportunity is various and may be called the channel access method of the STA. A conventional channel access scheme includes functions provided in a MAC sublayer, such as a Distributed Coordination Function (DCF), a Point Coordination Function (PCF), and a Hybrid Coordination Function (HCF).

The DCF is a contention-based channel access method and known as a Carrier Sense Multiple Access with Collision Avoidance (CSMA/CA) scheme as the basic channel access method of a WLAN system. The PCF is a contention-free channel access method.

The HCF is a coordination function that combines and enhances aspects of the contention-based and contention-free access methods to provide quality of service (QoS) stations (STAs) with prioritized and parameterized QoS access to the Wireless Medium (WM), while continuing to support non-QoS STAs for best-effort transfer. The HCF includes the functionality provided by both enhanced distributed channel access (EDCA) and HCF controlled channel access (HCCA). The HCF is compatible with the distributed coordination function (DCF) and the point coordination function (PCF). It supports a uniform set of frame formats and exchange sequences that STAs may use during both the Contention Period (CP) and the contention-free period (CFP).

Meanwhile, a Machine-to-Machine (M2M) system, meaning a network in which machines, not humans, become the main bodies of communication and exchange pieces of information, has recently been in the spotlight as the next-generation communication technology, and a new standard for supporting the M2M system has been discussed even in a WLAN system.

In the M2M system, each UE may be a sensor for measuring temperature, humidity, etc., a camera, electric home appliances, such as TV, a process machine in a factory, or a large-sized machine, such as a vehicle. With the advent of various communication services, such as smart grid, e-Health, and ubiquitous, the importance of the M2M technology for supporting the various communication services has been clearly brought out. When the WLAN technology is applied to a network including the M2M system, the following characteristics of the M2M system must be taken into account.

1) A very large number of STAs: The network of the M2M system can support a large number of STAs as compared with the existing other networks. This is because the network of the M2M system includes a relatively wide geographical area and various types of UEs as its elements. Accordingly, when the WLAN technology is applied to the M2M system, a large number of STAs (each UE of the M2M system) may be connected to one AP.

2) Low traffic load per STA: An M2M UE has a traffic pattern of collecting and reporting surround information. Accordingly, information needs not to be frequently transmitted, and the amount of the information is small.

3) Uplink-oriented: An M2M is configured to receive a command in downlink, take action, and report resulting data in uplink. Thus, uplink becomes the center in the M2M because major data is chiefly transmitted in uplink.

4) Longer lifespan of STA: An M2M UE is chiefly operated by the battery, and a user may not frequently charge the battery. Accordingly, the consumption of the battery needs to be minimized in order to increase the life span.

5) Automatic recovery function: An M2M UE needs an automatic recovery function because a person may not directly manipulate the M2M UE in a special situation.

When the characteristics (in particular, an environment characteristic in which a very large number of STAs access an AP) of the M2M system are taken into account, the layered channel access method proposed by the present invention may be effectively applied to the M2M system. An example where the layered channel access method applied to the M2M system is described for convenience of description. However, the layered channel access method proposed by the present invention is not limited to the M2M system, but may be applied to common WLAN systems in various ways.

The most common server/client structure from among the existing network models not M2M communication is described below. A client (STA) requests information from a server, and the server sends relevant information (data) to the STA. Here, the server may be considered as a machine that mechanically collects information and provides the information, and the main body that receives the information is a user who uses the client (STA). This is because the existing communication system has been developed on the basis of downlink for the client (STA). In the M2M network, however, the structure is changed. That is, the client (STA) (i.e., a machine) functions to collect and provide information, and a user who handles the server requests the information. In other words, the M2M server issues a command, regarding surrounding environment measurement, to the M2M UE, and the M2M UE performs sensing according to the command and reports it to the M2M server. That is, it can be seen that the flow of information is reversed because a person accesses a network from a viewpoint of the server. Accordingly, for effective M2M communication, in the existing WLAN system, the functions of a non-AP STA have to be reduced and a management function in a network has to be expanded.

Accordingly, it can be seen that, when a WLAN system is applied to the network of the M2M system, network management technology needs to be taken into account again from a changed point of view. In a previous network model, the network management function was also given to an STA because a person is on the part of the STA. In the M2M system, however, the network management function on the part of the server has to be further enhanced because an STA has only to provide information according to a command.

In the M2M system, however, a case where several thousands of STAs are accessed to an AP may be taken into account in terms of actual system implementation. In this case, to implement the same WM according to the CSMA/CS scheme (i.e., the common channel access scheme of a WLAN system) may not be preferable. That is, a scheme in which one STA occupies a WM and performs communication at once may have a limit to effective network management. For example, it is assumed that a WLAN is used in a sub 1 GHz frequency band represented by a frequency band 700 to 900 MHz not the existing 2.4 GHz frequency band or the existing 5 GHz frequency band. In a WLAN system using the sub 1 GHz frequency band, the coverage of an AP may be expanded to 2 to 3 times as compared with a case where the coverage of 2.4 GHz frequency band is used owing to the radio wave characteristic of the relevant frequency band assuming that transmit power is the same. Accordingly, it is preferred that an AP having a relatively wide coverage be associated with a large number of STAs and the AP manage the STAs.

In order to effectively support the layered channel access scheme and effective network management for a large number of STAs, a group-based network management scheme for managing STAs associated with an AP on a group basis may be used.

Figure 4:
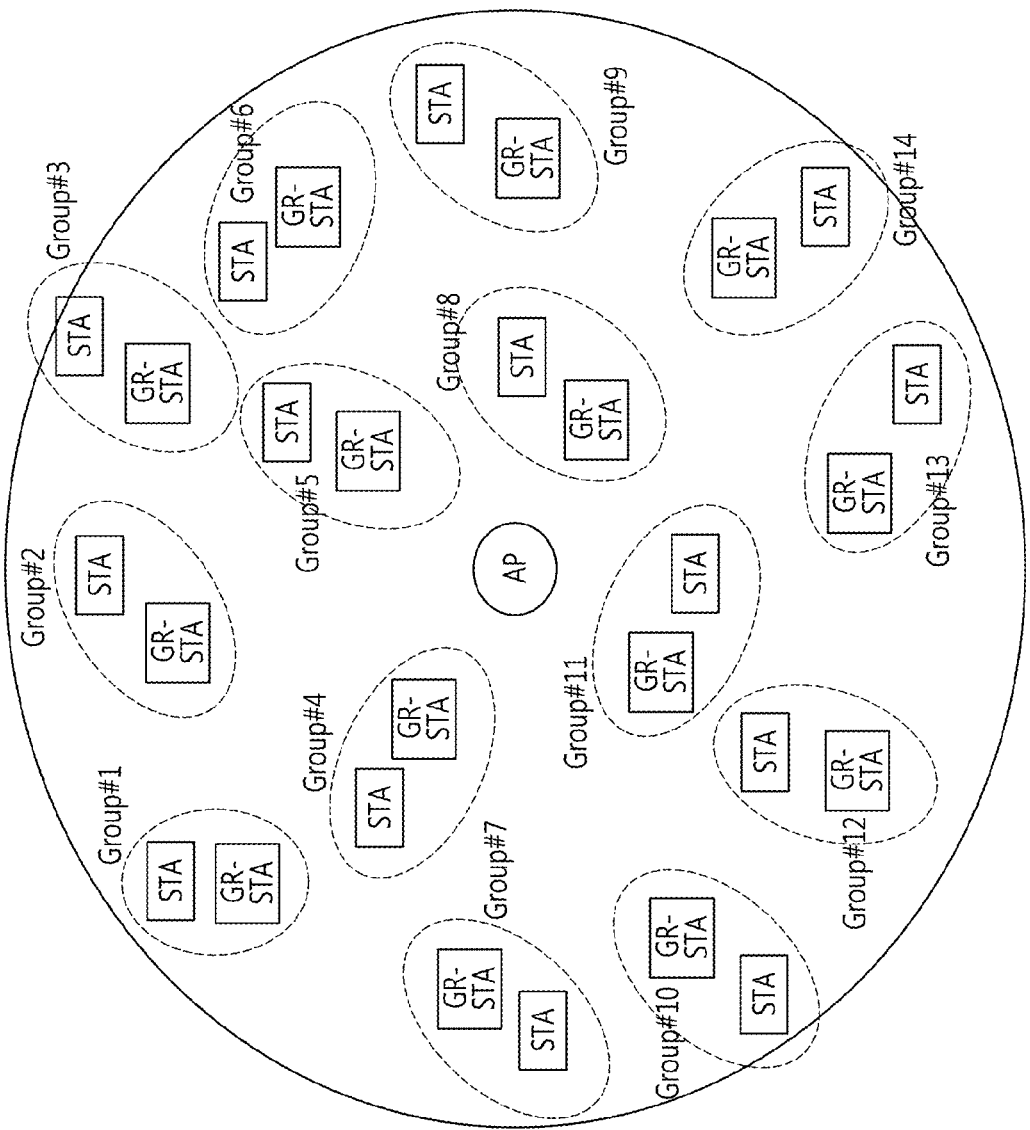
FIG. 4 illustrates the configuration of a group-based network according to an embodiment of the present invention.

FIG. 4 illustrates the configuration of a group-based network according to an embodiment of the present invention.

Referring to FIG. 4, one AP exists, and the coverage of the AP is indicated by a circle of a solid line. The coverage of the AP may refer to a signal arrival distance that an STA may receive a radio frame when the AP sends the radio frame at a minimum supported rate. The example of FIG. 4 shows an environment, including one AP and a plurality of STAs associated with the AP. In FIG. 4, an ellipse indicated by a dotted line shows each group according to an embodiment of the present invention. One group includes at least one STA. In the example of FIG. 4, the number of groups or the number of STAs belonging to each group is illustrative and not limited.

In the group-based network according to the embodiment of the present invention, an STA representing a relevant group may be designated on a group basis. An STA representing a specific group is hereinafter called a Group Representative (GR)-STA.

In FIG. 4, all the STAs are associated with the AP. In an association procedure, each STA may provide the AP with additional information, such as location information, including an association request frame. In the association procedure, the AP may provide an association response frame, including information about a group to which a relevant STA belongs and about the GR-STA of the group. Here, the AP may determine a group to which the relevant STA will belong on the basis of position information received from the STA.

FIG. 5 is a block diagram showing an example of a format of a Group Indication Information Element (IE) that may be included in the association response frame and transmitted.

In the example of FIG. 5, a group index field includes information for identifying a group to which an STA receiving the Group Indication IE will belong. A GR-STA MAC address field includes information for identifying the GR-STA of a group which is indicated in the group index field. In the example of FIG. 5, the GR-STA MAC address is set, but only illustrative.

The name 'Group Indication IE' and the names 'group index field' and 'GR-STA MAC address field' included in the Group Indication IE are arbitrary. The Group Indication IE may further include fields, including supplementary information (e.g., a candidate group index, a candidate GR-STA ID, transmit power information in a relevant group), if necessary. In some embodiments, the group index field and the GR-STA MAC address field may be included in the existing IE of the IEEE802.11 standard and then transmitted. The GR-STA MAC address field may be set as a value (e.g., a GR-STA AID, a GR-STA MAC address, or a GR-STA ID obtained from an AID) for identifying a GR-STA other than the GR-STA MAC address.

An STA may know a group to which the STA belongs and the GR-STA of the group to which the STA belongs on the basis of the Group Indication IE.

The Group Indication IE of FIG. 5 may be included in the reassociation response frames and the probe response frame and transmitted, not only in the association procedure, but also in the reassociation procedure or the scanning process.

In another embodiment, an AP may inform each STA of ID information about a group to which the relevant STA will belong and of GR-STA ID information of the relevant group by using a management frame.

FIG. 6 shows an example of a format of the management frame for informing an STA of a group and GR-STA information about the group. In FIG. 6, the functions of a group index field and a GR-STA MAC address field and information including the fields are the same as those of FIG. 5.

An AP may inform an STA of group information and GR-STA ID information of a relevant group by sending a group indication management frame to the STA. In addition, an AP may send the group indication management frame so that an STA can change a group, allocated through the scanning, association, or reassociation procedure or a previous group indication management frame, into a new group and provide GR-STA ID information of a new group.

If an AP attempts to change the GR-STA of a specific group, the AP may use the group indication management frame. Here, the AP may change GR-STA ID information about a field (the GR-STA MAC address field in the example of FIG. 6), including GR-STA ID information in the group indication management frame and send the change GR-STA ID information. The group indication management frame transmitted in order to change a GR-STA may be transmitted to each of STAs, belonging to the GR-STA, through an individually addressed management frame or may be transmitted to STAs, belonging to a group represented by the GR-STA, through a group addressed management frame.

An STA that has received the group indication management frame may know that a group to which the STA belongs has changed based on a changed group index, if a Group Index field value is different from its current group index value, and know the GR-STA of the changed group based on GR-STA ID information received together with the changed group index.

If a Group Index field value is not changed, but only ID information (e.g., the GR-STA MAC address field value) of a GR-STA is changed, an STA may know that only the GR-STA has changed in the state where a group to which the STA belongs remains intact. Here, if the GR-STA MAC address field value is identical with its own MAC address, the STA knows that it has been designated as the GR-STA of the group. In the above description, it is evident that the GR-STA MAC address field may be set as the AID value of a GR-STA or the ID of a GR-STA as in the embodiment described with reference to FIG. 5.

Referring back to FIG. 4, one STA group may include one GR-STA and at least one common STA. According to an embodiment of the present invention, GR-STAs may represent common STAs within their groups and further function to transmit and receive data to and from an AP. In the channel access method according to an embodiment of the present invention, a channel access period in which only the GR-STAs of respective groups can communicate with an AP (hereinafter referred to as a 'GR communication phase') and a channel access period in which local communication can be performed between a GR-STA and common STAs (i.e., relevant group members) (hereinafter referred to as a 'local communication phase') may be temporally divided and operated. Hereinafter, the present invention proposes the channel access scheme, which is called a 'Layered Channel Access (LCA)' scheme.

The LCA mechanism according to an embodiment of the present invention is described in detail below.

FIG. 7 is a block diagram showing an example of a format of an LCA IE. The LCA IE may be included in a beacon frame and broadcasted to all STAs.

The LCA IE may include a Local Communication Offset field, a Local Communication Duration field, a Local Communication Max Transmit Power field, a GR Communication Offset field, a GR Communication Duration field, and a GR Communication Max Transmit Power field.

The Local Communication Offset field may be set to a value indicating the start time of the local communication phase. The Local Communication Duration field may be set to a value indicating the duration of the local communication phase. The Local Communication Max Transmit Power field may be set to a value indicating a maximum power value which is permitted when an STA sends a radio frame in the local communication phase.

The GR Communication Offset field may be set to a value indicating the start time of the GR communication phase. The GR Communication Duration field may be set to a value indicating the duration of the GR communication phase. The GR Communication Max Transmit Power field may be set to a value indicating a maximum power value which is permitted when an STA sends a radio frame in the GR communication phase.

An STA may receive a beacon frame and obtain the start times and the durations of the local communication phase and the GR communication phase and Max transmit power information permitted in a relevant phase from the LCA IE which is included in the beacon frame and transmitted.

As an example of the operation of an STA, the STA may receive a beacon frame, participate in Local Communication in a Local Communication duration set in the Local Communication Duration field after a lapse of an offset time set in the Local Communication Offset field, and transmit a radio frame using transmit power which is equal to or lower than a value set in the Local Communication Max Transmit Power field.

Likewise, after the beacon frame is transmitted, the GR communication phase is set in a duration set in the GR Communication Duration field after a lapse of an offset time set in the GR Communication Offset field. All GR-STA(s) and an AP participating in the GR Communication may transmit radio frames using transmit power lower than a Max transmit power set in the GR Communication Max Transmit Power field. The Offset/Duration field values may mean actual time values of microseconds or may be set as field values of other forms that are previously defined. The Max Transmit Power field values may mean values of dBm and may be set as units of other forms that are previously defined.

In the example of FIG. 7, the number of bits allocated to each of the Offset/Duration fields and the Max Transmit Power fields are arbitrary and may be increased or decreased, if necessary. Furthermore, the field values are used to inform all STAs within a BSS of respective pieces of information, and the order of the fields in the LCA IE may be changed, if necessary. Fields including supplementary information may be further added to the LCA LE according to implementations.

As a detailed example, it is assumed that the Local Communication Offset value is smaller than the GR Communication Offset value. In this case, after a beacon frame is transmitted, the local communication phase is first started.

Figure 8:
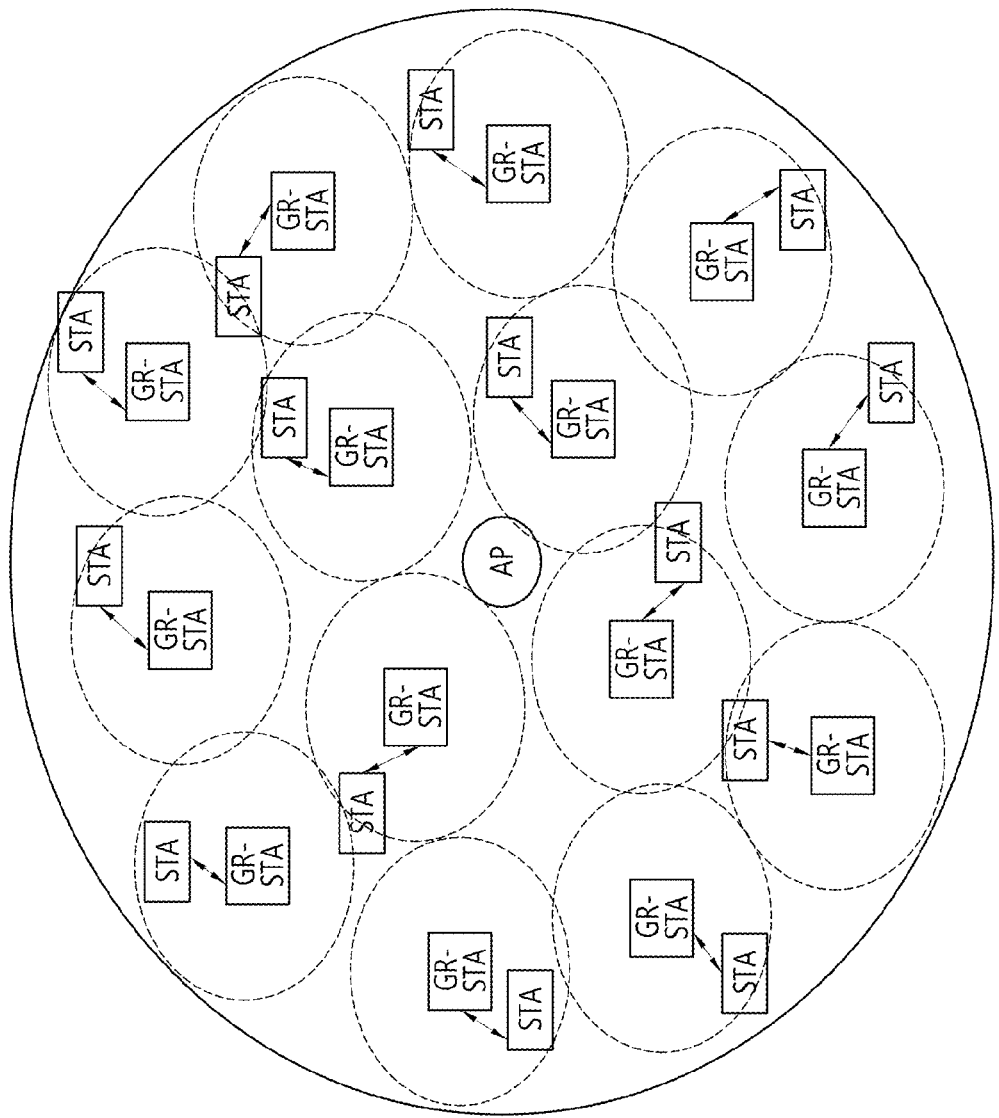
FIG. 8 illustrates the operations of STAs in the local communication phase according to an embodiment of the present invention.

FIG. 8 illustrates the operations of STAs in the local communication phase according to an embodiment of the present invention.

The characteristics of the operations of STAs within each group during the local communication phase are described below.

Both a GR-STA and common STAs have to send signals using transmit power lower smaller than a Max transmit power limit value based on a Local Communication Max Transmit Power field value at the time of Local Communication. That is, during the phase, the GR-STA and the common STAs are not allowed to communicate with an AP, but group members and the GR-STA can communicate with each other. Accordingly, the GR-STA and the common STAs have to send the signals using power smaller than a maximum permitted transmit power for the spatial reuse of a WM as shown in FIG. 8.

Even in the local communication phase in which the transmission and reception of radio frames are performed between the GR-STA and the common STA(s) of a relevant group on a group basis, the radio frames are transmitted and received through medium access according to the CSMA/CS mechanism in the communication between the common STAs and the GR-STA. The radio frames, however, are transmitted and received at the same time in a plurality of groups during the phase according to the spatial reuse effect because they are transmitted and received using relatively low power. Accordingly, there is an effect that network throughput is increased.

Figure 9:
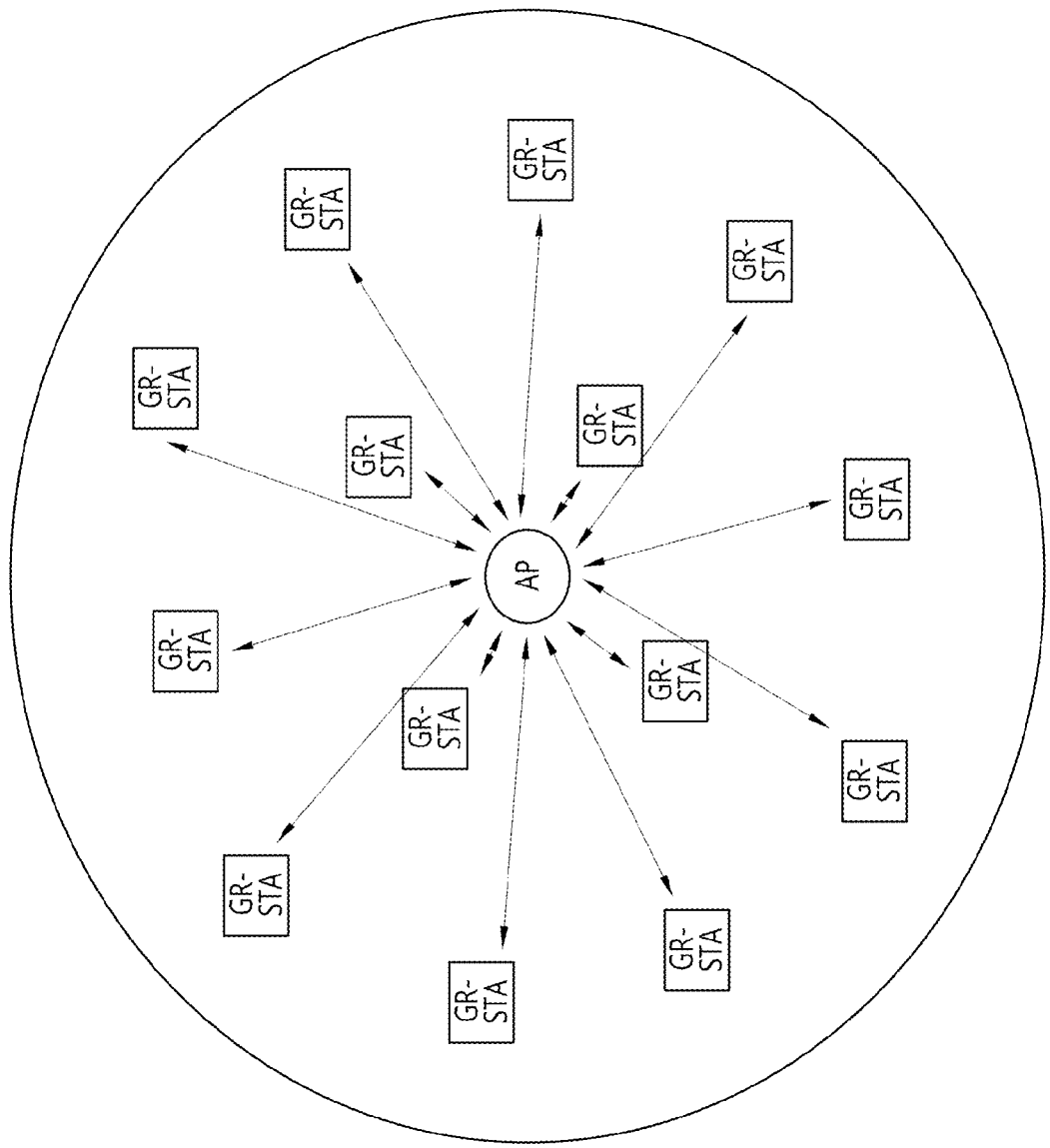
FIG. 9 illustrates the operations of STAs in a GR communication phase according to an embodiment of the present invention.

FIG. 9 illustrates the operations of STAs in the GR communication phase according to an embodiment of the present invention.

According to a value set in the GR Communication Offset field, the LCA mechanism-the GR communication phase is started as in FIG. 9. During the GR communication phase, the common STAs of each group set a Network Allocation Vector (NAV) and defer access during a duration set in the GR Communication Duration field. In the GR communication phase, only communication between the GR-STA of each group and AP is possible.

The GR-STAs and the AP may transmit radio frames using transmit power equal to or lower than a Max transmit power value, set in the GR Communication Max Transmit Power field, in the GR communication phase. A radio frame transmission/reception scheme between the GR-STA(s) and the AP may be based on a contention-based channel access scheme according to a normal CSMA/CS scheme.

GR-STAs may transmit data, received from common STAs within respective groups represented by the GR-STAs, and data to be transmitted from each GR-STA to an AP, to the AP in the local communication phase. When the GR-STA sends the data, received from each STA in the local communication phase, to the AP, the GR-STA may aggregate the data received from the common STAs and send the aggregated data through one data frame. In this case, a scheme for compressing redundant data or for reducing the number of times of transmission, the amount of transmission, etc. according to an application may be further used. Accordingly, link efficiency can be increased through the scheme.

The AP may also transmit data to be transmitted to each GR-STA and STAs represented by the GR-STA to the GR-STA in the GR communication phase. When group-based data is transferred to the GR-STAs in the communication phase and the local communication phase is then reached again, each of the GR-STAs may be operated in such a way to transfer data to common STAs.

A network may be effectively managed for every STA group through the LCA mechanism proposed by the present invention even in an environment in which a very large number of STAs are associated with one AP. Network throughput can be improved owing to spatial reuse and a collision can be effectively handled even in a special situation in which a large number of STAs content with each other at the same time, through the layered channel access scheme divided into the local communication phase and the GR communication phase. Furthermore, since a GR-STA relays data between common STAs and an AP, various forms of group-based communication, such as that data is compressed or the number of times of transmission and the amount of transmission are reduced according to an application scheme previously defined in this process are possible.

According to another embodiment of the present invention, GR-STAs may be operated as respective APs in the local communication phase of the layered channel access scheme.

The GR-STAs may be associated with common STAs within their coverages in the local communication phase. A GR-STA operated as described above is referred to as a GR-AP, for the sake of convenience.

In the present embodiment, a BSS may include one AP, a GR-AP capable of playing the role of an AP within each STA group, and a low power STA belonging to each group. Here, only the AP is linked to a backhaul link that may access the Internet. In other words, the AP is connected to a Distribution Service (DS) through backhaul. However, the GR-AP is not directly connected to the DS, but it may access the DS through only the AP.

Figure 10:
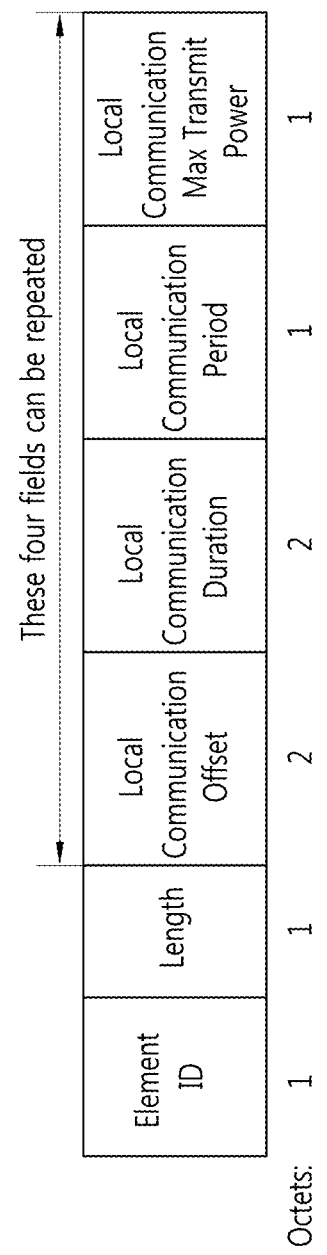
FIG. 10 is a block diagram showing an example of a format of an LCA IE which may be included in a beacon frame and transmitted according to an embodiment of the present invention.

FIG. 10 is a block diagram showing an example of a format of an LCA IE which may be included in a beacon frame and transmitted according to an embodiment of the present invention.

The LCA IE may include a Local Communication Offset field, a Local Communication Duration field, a Local Communication Period field, and a Local Communication Max Transmit Power field.

The Local Communication Offset field, the Local Communication Duration field, and the Local Communication Max Transmit Power field have the same functions as the respective fields of FIG. 7. That is, the Local Communication Offset field, the Local Communication Duration field, and the Local Communication Max Transmit Power field indicate the start time, the duration, the Max transmit power of the local communication phase, respectively. When the local communication phase is periodically repeated, the Local Communication Period field may be set to a value indicating the cycle. The Local Communication Offset field, the Local Communication Duration field, and the Local Communication Max Transmit Power field may be repeated in one LCA IE. Here, how many types of the local communication phases exist may be indicated in a Length field. If a plurality of local communication phases exists, a different Max Transmit Power value may be set in each of the local communication phases. For example, a maximum limit value of transmit power may be classified into several levels, including a first phase where only the lowest transmit power is permitted and a second phase where only an intermediate transmit power is permitted, and a first local communication phase, a second local communication phase, and a third local communication phase may be set, and STAs may be operated using different maximum transmit powers in the respective local communication phases.

In the present embodiment, a GR-AP, unlike an AP, does not have a backhaul link for directly accessing the Internet. For this reason, in order to access a DS, the GR-AP is associated with the AP according to a common procedure. The GR-AP may play the role of a low power AP during the local communication phase while being associated with surrounding common STAs that further want low power communication.

A GR-AP may communicate with an AP or other STAs according to a common CSMA/CS procedure, in addition to the local communication phase indicated in an LCA IE, such as that shown in FIG. 10. During the period, the GR-AP may relay data, received from low power STAs collected at the time of local communication, to an AP, aggregate or compress the data, and send the aggregated or compressed data. A GR-AP may also receive data, transmitted to low power STAs associated therewith, from an AP and then send the received data to the low power STAs during the local communication phase.

A GR-AP may send a beacon frame with low power during the local communication phase. A beacon frame transmitted by the GR-AP in the communication phase is hereinafter referred to as a GR-beacon frame different from the beacon frame transmitted by an AP. Since a GR-AP is operated in the form of a low power AP only during the local communication phase, the GR-beacon frame may be transmitted only in a relevant phase using maximum transmit power indicated in an LCA IE. A low power STA that has received the GR-beacon frame may perform communication using low power by sending an association request frame in the relevant phase, after finishing the association and authentication procedures with the GR-AP through a subsequent handshaking process. Furthermore, even when a GR-AP has received a probe request frame from a low power STA according to active scanning, the GR-AP may send a probe response frame to the low power STA in response to the probe request frame during the local communication phase indicated in an LCA IE and then perform the association and authentication procedures likewise.

Figure 11:
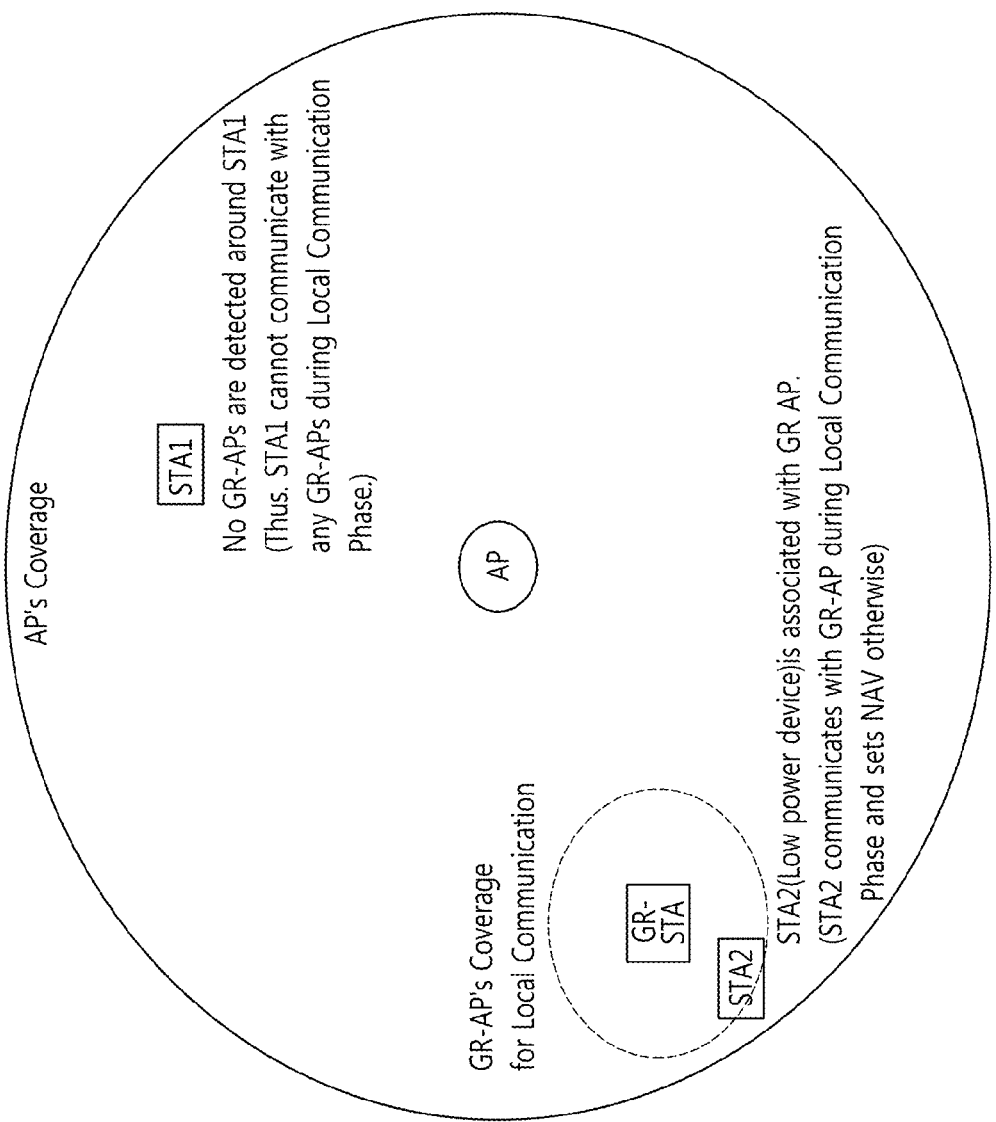
FIG. 11 illustrates the operation of an STA according to an embodiment of the present invention.

FIG. 11 illustrates the operation of an STA according to an embodiment of the present invention.

An STA wanting low power communication has to first receive a normal beacon frame from an AP when the STA is first turned on. The STA may successfully receive a beacon frame and obtain information, indicated in an LCA IE, from the beacon frame. The STA may send a low power probe request frame for active scanning at the start time of the local communication phase indicated in the LCA IE. In case of passive scanning, the STA receives a low power beacon frame transmitted by a neighboring GR-AP. The STA may perform the association and authentication procedures with a neighboring GR-AP retrieved through scanning.

If a neighboring GR-AP is not retrieved through the above procedures or access is difficult, the STA may scan a GR-AP that may be associated therewith through active/passive scanning by using higher transmit power in another local communication phase in which higher maximum transmit power is indicated in an LCA IE.

After the STA is associated with the GR-AP through the procedures, the STA may perform low power communication in each relevant local communication phase (in case of an STA2 of FIG. 11) and it may not be associated with a GR-AP when there is no neighboring GR-AP geographically. An STA capable of performing high power communication (in case of an STA1 of FIG. 11), however, may be directly associated with an AP and it may perform communication with the AP. In other words, if an STA desires low power communication, the STA may perform local communication by detecting and accessing a GR-AP. An STA indispensably not requiring power saving may perform communication with an AP through direct association with an AP.

FIG. 11 shows an example where the STA1 directly communicate with an AP using high power because a neighboring GR-AP is not detected and the STA2 is associated with a GR-AP using lower power because a neighboring GR-AP exists and the STA2 transmits and receives radio frames to and from the GR-AP using low power during the local communication phase indicated in the LCA IE of the GR-beacon frame.

Figure 12:
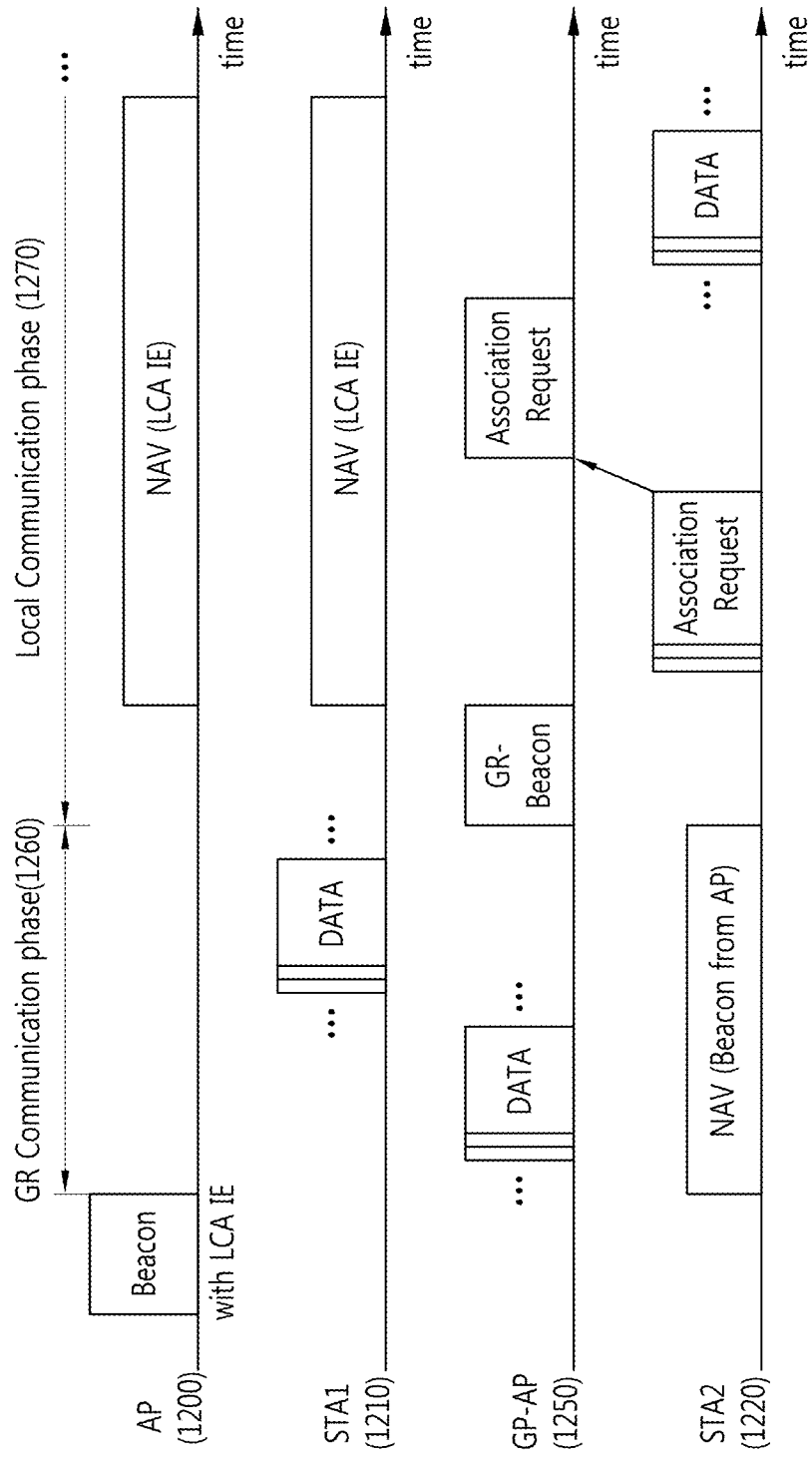
FIG. 12 shows a layered channel access method according to the flow of time according to an embodiment of the present invention.

FIG. 12 shows a layered channel access method according to the flow of time according to an embodiment of the present invention.

An AP 1200 periodically broadcasts a beacon frame. The beacon frame includes an LCA IE. All STAs, an STA1 1210, a GR-AP 1250, and an STA2 1220 within a BSS that have received the beacon frame know the start time, the duration, and the maximum transmit power value of a local communication phase 1270 based on the LCA IE. Before the local communication phase 1270 is started according to the Local Communication Offset field value of the LCA IE, the STA1 1210 and the GR-AP 1250 may transmit and receive radio frames according to a common CSMA/CS procedure. In a GR communication phase 1260, the STA2 1220 sets an NAV and defers channel access.

When the local communication phase 1270 is started, both the AP 1200 and the STA1 1210 performing high power communication may set an NAV, and both the GR-AP 1250 and the STA2 1220 performing low power communication may send signals according to the CSMA/CS procedure by using transmit power equal to or lower than a Local Communication Max Transmit Power field value indicated in the LCA IE.

At this time, in the local communication phase 1270, the GR-AP 1250 may periodically send a GR-beacon frame, and the STA2 1220 may send an association request frame to the GR-AP 1250 and transmit and receive a data frame DATA through the association procedure for receiving an association response frame from the GR-AP 1250. All management frames, all control frames, and all data frames, including the beacon frame, the association request/response frames, and the authentication request/response frames transmitted in the local communication phase 1270, may be transmitted using only transmit power equal to or lower than the Local Communication Max Transmit Power field value indicated in the LCA IE.

Figure 13:
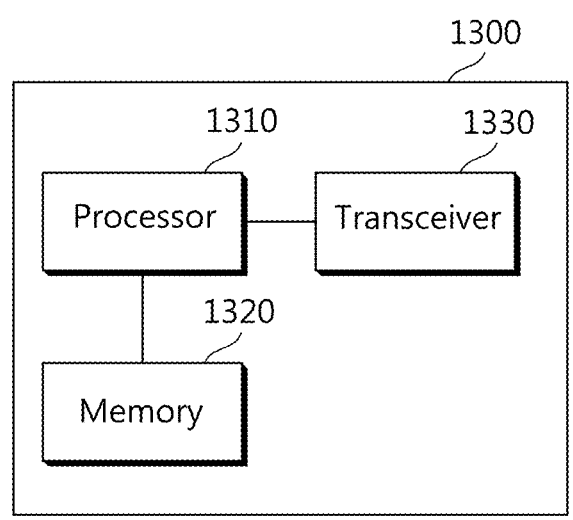
FIG. 13 is a block diagram of a wireless apparatus in which the embodiments of the present invention are implemented.

FIG. 13 is a block diagram of a wireless apparatus in which the embodiments of the present invention are implemented. The wireless apparatus 1300 may be an AP, a GR-STA, a GR-AP, or a non-AP STA.

The wireless apparatus 1300 includes a processor 1310 configured to implement the layered channel access method. The wireless apparatus may further include memory 1320, a transceiver 1330, and a user interface (not shown). The transceiver 1330 may send not only the beacon frame, but also the management frame, the control frame, and the data frame which are generated by the processor 1310 and are necessary to implement the present invention through a WM. The physical layer and the MAC layer of IEEE 802.11 are implemented in the processor 1310, and the processor 1310 is configured to generate and send frames necessary to implement the present invention. The processor 1310 or the transceiver 1330 or both may include Application-Specific Integrated Circuits (ASICs), other chipsets, logic circuits, and/or data processors. The memory 1320 may include Read-Only Memory (ROM), Random Access Memory (RAM), flash memory, memory cards, storage media and/or other storage devices. When the embodiment is implemented in software, the above scheme may be implemented using a module (process or function) which performs the above function. The module may be stored in the memory 1320 and executed by the processor 1310. The memory 1320 may be placed inside the processor 1310 or may be placed outside the processor 1310 and functionally coupled to the processor 13100 by a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for accessing a wireless medium in a wireless local area network, the method comprising:
receiving, by a station, from an access point (AP), a beacon frame for a restricted medium access to groups of stations in order to spread uplink access attempts of the groups of stations over a period of time, the beacon frame including group indication information and channel access information, the group indication information including information indicating a plurality of station groups that are associated with the AP and are allowed to access an uplink channel, the channel access information indicating a plurality of communication phases, each of the plurality of communication phases associated with a corresponding one of the plurality of station groups;
determining by the station, that the station belongs to one of the plurality of station groups; and
accessing, by the station, the uplink channel for uplink transmission during a communication phase for the station group to which the station belongs,
wherein the beacon frame is periodically transmitted by the AP with a period of a beacon interval,
wherein each of the plurality of communication phases occurs at a different time from the other of the plurality of communication phases within the beacon interval,
wherein each of the plurality of station groups is allowed to access the uplink channel only during an associated communication phase of the beacon interval, and
wherein the station is not allowed to access the uplink channel during a communication phase for any station group to which the station does not belong.

2. The method of claim 1, wherein the channel access information includes information indicating a plurality of starting offsets for the plurality of communication phases, each of the plurality of starting offsets indicating a duration from the end of the beacon frame that includes the channel access information to a start time of a corresponding one of the plurality of communication phases.

3. The method of claim 1, wherein the channel access information includes information indicating a plurality of durations for the plurality of communication phases.

4. A device that accesses a wireless medium in a wireless local area network, the device comprising:
a transceiver that receives and transmits radio signals; and
a processor operatively coupled with the transceiver that:
instructs the transceiver to receive, from an access point (AP), a beacon frame for a restricted medium access to groups of stations in order to spread uplink access attempts of the groups of stations over a period of time, the beacon frame including group indication information and channel access information, the group indication information including information indicating a plurality of station groups that are associated with the AP and are allowed to access an uplink channel, the channel access information indicating a plurality of communication phases, each of the plurality of communication phases associated with a corresponding one of the plurality of station groups;

determines that the device belongs to one of the plurality of station groups; and instructs the transceiver to access the uplink channel for uplink transmission during a communication phase for the station group to which the device belongs, wherein the beacon frame is periodically transmitted by the AP with a period of a beacon interval, wherein each of the plurality of communication phases occurs at a different time from the other of the plurality of communication phases within the beacon interval, wherein each of the plurality of station groups is allowed to access the uplink channel only during an associated communication phase of the beacon interval, and wherein the device is not allowed to access the uplink channel during a communication phase for any station group to which the device does not belong.

5. The device of claim 4, wherein the channel access information includes information indicating a plurality of starting offsets for the plurality of communication phases, each of the plurality of starting offsets indicating a duration from the end of the beacon frame that includes the channel access information to a start time of a corresponding one of the plurality of communication phases.

6. The device of claim 4, wherein the channel access information includes information indicating a plurality of durations for the plurality of communication phases.

* * * * *